(12) United States Patent
Hattori et al.

(10) Patent No.: US 7,919,560 B2
(45) Date of Patent: Apr. 5, 2011

(54) RUBBER COMPOSITION AND STUDLESS TIRE OBTAINED BY USING THE RUBBER COMPOSITION

(75) Inventors: Takayuki Hattori, Kobe (JP); Naohiko Kikuchi, Kobe (JP); Ryoji Kojima, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 236 days.

(21) Appl. No.: 12/216,865

(22) Filed: Jul. 11, 2008

(65) Prior Publication Data
US 2009/0018272 A1    Jan. 15, 2009

(30) Foreign Application Priority Data

Jul. 13, 2007   (JP) ................. 2007-184034
Mar. 28, 2008   (JP) ................. 2008-087397

(51) Int. Cl.
*C08L 9/00*   (2006.01)
(52) U.S. Cl. ........................................ 525/232
(58) Field of Classification Search ............ 525/232
See application file for complete search history.

(56) References Cited

U.S. PATENT DOCUMENTS

| | | | |
|---|---|---|---|
| 4,528,331 A | | 7/1985 | Bohm et al. |
| 5,760,135 A | * | 6/1998 | Korpman et al. ............ 525/95 |
| 2007/0135564 A1 | | 6/2007 | Appel et al. |

FOREIGN PATENT DOCUMENTS

| | | |
|---|---|---|
| EP | 1 529 806 A1 | 5/2005 |
| JP | 7-118455 A | 5/1995 |
| JP | 2005-146115 A | 6/2005 |
| JP | 2006-206872 A | 8/2006 |
| WO | WO-00/69928 A2 | 11/2000 |

OTHER PUBLICATIONS

Isobe C. et al., Database WPI Week 200661, XP-00250300.

* cited by examiner

*Primary Examiner* — Nathan M Nutter
(74) *Attorney, Agent, or Firm* — Birch, Stewart, Kolasch & Birch, LLP

(57) ABSTRACT

The object of the present invention is to provide a rubber composition suitable for a studless tire, which can inhibit rubber hardness increase with time and reveals excellent performance on ice and snow for a long time. The present invention relates to a rubber composition comprising 1 to 60 parts by weight of hydrogenized liquid polybutadiene based on 100 parts by weight of a rubber component containing at least 80% by weight of a natural rubber and a butadiene rubber, wherein a peak temperature of tan $\delta$ is at most 45° C. and rubber hardness at 0° C. is at most 64.

8 Claims, No Drawings

RUBBER COMPOSITION AND STUDLESS TIRE OBTAINED BY USING THE RUBBER COMPOSITION

This Nonprovisional application claims priority under 35 U.S.C. §119(a) on Patent Application No(s). 2007-184034 filed in Japan on Jul. 13, 2007 and 2008-087397 filed in Japan on Mar. 28, 2008, the entire contents of which are hereby incorporated by reference.

TECHNICAL FIELD

The present invention relates to a rubber composition and a studless tire obtained by using the rubber composition.

BACKGROUND ART

Usually, in a rubber composition used in a tire, process oils have been used as a softener in order to soften the rubber. Examples of the process oil include petroleum softeners such as paraffin process oils, aromatic process oils and naphthene process oils (see JP-A-Hei7-118455).

However, since the process oil migrates through the tire rubber over time and gradually separates out on to the surface to disperse on a road or in the atmosphere, the effect of the softener decreases, and the hardness of the rubber increases.

Particularly in a studless tire, if the rubber hardness increases, there arises the problem that excellent performances on snow and ice cannot be maintained.

Rubber compositions for treads in truck or bus pneumatic winter tires, particularly studless tires for a truck or bus, employ a rubber such as a butadiene rubber that is mixed with a rubber having an excellent tensile strength and abrasion resistance, such as a natural rubber in order to improve ice performance and snow performance by softening the surface. These compositions further employ fillers such as carbon black in order to improve reinforcement and strength. Abrasion resistance is especially desired for truck and bus tires, and there may be some hesitation to compound in a plasticizer for processability and a tackifier for imparting adhesion.

However, if the plasticizer and the tackifier are not compounded, it is likely that processability at molding is insufficient such that problems during processing occur. Particularly, butadiene rubber generally has poor processability and low adhesion properties, which need to be improved. If a low polar plasticizer such as mineral oil is added, processability is improved and adhesion increases, but the abrasion resistance becomes low. It is possible to use a tackifier such as a petroleum resin and a phenol resin, but abrasion resistance inevitably remains low. It is also possible to use an aroma oil. In this case, the abrasion resistance is slightly better compared with results using mineral oil or a tackifier, but it decreases at some point and performance on ice and snow deteriorate.

The demand for improved abrasion resistance in a tire for a truck or bus is high and there have been some instances of winter tire use roads without snow or ice road as a reaction to recent global warming warnings or the inconvenience of changing winter tires for the summer. Therefore, improvement of abrasion resistance in the tread of truck or bus pneumatic winter tires, particularly studless tires for a truck or bus, has been in high demand.

SUMMARY OF THE INVENTION

The object of the present invention is to provide a rubber composition suitable for a studless tire, which inhibits increasing rubber hardness over time and particularly exhibits excellent ice and snow performance for a long period. Furthermore, the present invention aims to provide a truck or bus pneumatic tire for winter having a high performance which exhibits excellent processability/adhesion properties, performance on ice and snow, and abrasion resistance.

The present invention relates to a rubber composition comprising 1 to 60 parts by weight of hydrogenised liquid polybutadiene based on 100 parts by weight of a rubber component containing at least 80% by weight of a natural rubber and a butadiene rubber, wherein a peak temperature of tan δ is at most 45° C. and rubber hardness at 0° C. is at most 64.

It is preferable that the average molecular weight of the hydrogenised liquid polybutadiene is 600 to 20000, and the hydrogenization ratio of the double bond is 20 to 60%.

Further, the present invention also relates to a studless tire, or a truck or bus pneumatic tire for winter, which is obtained by using the above rubber composition.

DETAILED DESCRIPTION OF THE INVENTION

The rubber composition comprises 1 to 60 parts by weight of hydrogenised liquid polybutadiene based on 100 parts by weight of a rubber component containing at least 80% by weight of a natural rubber and a butadiene rubber, and a peak temperature of tan δ is at most 45° C. and rubber hardness at 0° C. is at most 64.

As the rubber component, a natural rubber and a butadiene rubber are contained. The natural rubber includes not only a natural rubber as it is, but also an epoxidized natural rubber (ENR) and a deproteinized natural rubber (DPNR).

The natural rubber and the butadiene rubber can be used in combination with other rubber components. Examples of the other rubber components are styrene-butadiene rubber (SBR), styrene-isoprene-butadiene rubber (SIBR), isoprene rubber (IR), ethylene-propylene-diene rubber (EPDM), chloroprene rubber (CR), butyl rubber (IIR), acrylonitrile-butadiene rubber (NBR), and the like.

In case of mixing with the other rubber component, the amount of a natural rubber and a butadiene rubber is preferably at least 80% by weight in the rubber component, more preferably at least 90% by weight, most preferably 100% by weight. If the amount is less than 80% by weight, strength at break tends to become lower.

In case that the rubber composition of the present invention is used to a truck or bus pneumatic tire for winter, the lower amount of the butadiene rubber (BR) in the tread rubber is preferably 20% by weight, more preferably 30% by weight, still more preferably 35% by weight, most preferably 50% by weight. On the other hand, the upper amount of thereof is preferably 80% by weight, more preferably 70% by weight, still more preferably 65% by weight, most preferably 60% by weight. If the amount of BR becomes large, performance on ice and snow becomes good, but abrasion resistance, processability and adhesion tend to become low. In the rubber composition of the present invention, abrasion resistance, processability, adhesion and performance on ice and snow become compatible each other by raising the amount of BR.

Hydrogenised liquid polybutadiene is a component used for a softener instead of a process oil, and can be prepared by hydrogenising liquid polybutadiene. Hydrogenization can be carried out by using a catalyst such as palladium according to the conventional hydrogenization process.

Average molecular weight of hydrogenised liquid polybutadiene is preferably at least 600, more preferably at least 800. If the molecular weight is less than 600, the effect of inhibiting increase of rubber hardness with time tends to be low, and the effects of imparting adhesion, processability and performance on ice and snow become high but abrasion resistance tends to be low. The molecular weight is preferably at most 20000, more preferably at most 18000. If the molecular weight is more than 20000, the effect of rubber as a softener tends to be low. If the amount is within this rage, processability can be improved and excellent performance on ice and snow can be revealed and abrasion resistance becomes excellent.

Hydrogenation ratio of a double bond in hydrogenised liquid polybutadiene is preferably at least 20%, more preferably at least 30%. If the hydrogenation ratio is less than 20%, polybutadiene is vulcanized as a rubber by sulfur and the effect as a softener tends not to be revealed. The ratio is preferably at most 60%, more preferably at most 55%. If the hydrogenation ratio is more than 60%, the effect of inhibiting the rubber hardness increase with time tends to be low, and the effects of imparting adhesion, processability and performance on ice and snow become high but abrasion resistance tends to be low. Herein, hydrogenation ratio can be calculated from spectrum reduction rate at unsaturated bonding in the spectrum obtained by measuring proton NMR.

The amount of hydrogenised liquid polybutadiene is at least 1 part by weight based on 100 parts by weight of the diene rubber component, preferably at least 5 parts by weights, more preferably 10 parts by weight. If the amount is less than 5 parts by weight, sufficient softening effect cannot be revealed. The amount is preferably at most 60 parts by weight, more preferably 50 parts by weight. If the amount is more than 60 parts by weight, processability becomes low and also abrasion resistance tends to be low.

On the other hand, in case that the rubber composition of the present invention is used for a truck or bus pneumatic tire for winter, the upper amount of the hydrogenised liquid polybutadiene is preferably 15 parts by weight, more preferably 10 parts by weight, most preferably 5 parts by weight. By adjusting the amount to this range, a truck and bus tire can be obtained which has excellent processability, improved adhesion property and abrasion resistance.

The process oil is not preferably used, but it can be used in a combination with a hydrogenised liquid polybutadiene.

To the rubber composition of the present invention, sulfur and a vulcanization accelerator, fillers such as carbon black, silica, clay, aluminum hydroxide and calcium carbonate, and additives such as a plasticizer, zinc oxide, a vulcanization assistant, a foaming agent, an antioxidant, and a wax can be compounded in addition to the above-mentioned rubber component and hydrogenised liquid polybutadiene, if necessary.

The amount of carbon black is not particularly limited, but the amount thereof is preferably at least 5 parts by weight, more preferably 10 parts by weight, based on 100 parts by weight of the rubber components. If the amount is less than 5 parts by weight, abrasion resistance tends to be low. And the upper amount is preferably at most 100 parts by weight, more preferably at most 80 parts by weight. If the amount is more than 100 parts by weight, viscosity tends to increase and processability becomes low.

The amount of silica is not particularly limited, but the amount thereof is preferably at least 5 parts by weight, more preferably at least 10 parts by weight, based on 100 parts by weight of the rubber components. If the amount is less than 5 parts by weight, abrasion resistance tends to be low. And the upper amount thereof is preferably at most 100 parts by weight, more preferably 80 parts by weight. If the amount is more than 100 parts by weight, viscosity tends to increase and processability becomes low.

Tan δ peak temperature of the rubber composition of the present invention shows the glass transition temperature of the rubber component. The temperature is at most −45° C., preferably at most −50° C. If the temperature is more than −45° C., hardness increase at a low temperature is large and performance on ice becomes low.

Rubber hardness at 0° C. of the rubber composition of the present invention is at most 64, preferably at most 62. If the hardness is more than 64, performance on ice becomes low.

The studless tire and a truck or bus pneumatic tire for winter of the present invention can be prepared by the following process comprising; kneading a rubber component, a hydrogenised liquid polybutadiene, optional reinforcing fillers and additives to obtain the uncured rubber composition, extruding the rubber composition into shape of the tire tread to form uncured tire on the tire molding machine, and then heating and pressuring the uncured tire in the vulcanizer.

An example of the truck or bus pneumatic tire for winter is a studless tire for a truck and bus. A tire for winter is one which can be used in the winter, and an example thereof is a tire for all seasons in addition to a studless tire.

EXAMPLES

The present invention is concretely explained based on the following examples below, but the present invention is not limited thereto.

Reference Example 1

To 200 g of liquid polybutadiene (RICON 130 available from SARTOMER (molecular weight 2500)) were added 300 g of THF, 10 g of 10% palladium carbon, and hydrogen purge was conducted at pressure of 5.0 kg/cm$^2$ after nitrogen purge was conducted to react at 80° C. Hydrogenization ratio was calculated from spectrum reduction rate at unsaturated bonding in the spectrum obtained by measuring 100 MHz proton NMR to obtain 52%.

Examples 1 to 2 and Comparative Examples 1 to 3

Material

NR: RSS#1
BR: BR150K available from Ube Industries, Ltd.
carbon black: SHOWBLACK N339 available from CABOT JAPAN K.K. silica: VN3 available from DEGUSSA
silane coupling agent: Si-69 available from DEGUSSA
aroma oil: Process X-140 available from JAPAN ENERGY CORPORATION
naphthene oil: Process P-200 available from JAPAN ENERGY CORPORATION
hydrogenised liquid polybutadiene: prepared in Reference Example 1
liquid polybutadiene (RICON 130 available from SARTOMER (molecular weight 2500)
antioxidant: Ozonone 6C available from Seiko Chemical Co. Ltd. wax: SUNNOC WAX available from OUCHI SHINKO CHEMICAL INDUSTRIAL COMPANY, LIMITED
stearic acid: Kiri available from NOF Corporation
zin oxide: zinc oxide second grade available from Mitsui Mining & Smelting Company, Limited
sulfur: sulfur powder available from Karuizawa iou kabushikikaisya
Vulcanization accelerator: Nocceler CZ available from OUCHI SHINKO CHEMICAL INDUSTRIAL COMPANY, LIMITED (Preparation Process)

Various agents other than sulfur and a vulcanization accelerator among the compounding components shown in Table 1 were kneaded by a Bunbury mixer, to the obtained kneaded product were added sulfur and various vulcanization accelerators, and were kneaded by an open roll to obtain a unvulcanized rubber composition. The unvulcanized rubber composition was press vulcanized for 25 minutes at 165° C. to obtain a vulcanized rubber sample. By using the obtained sample, the following evaluations were carried out.

(Measuring Method)

<Viscoelasticity Test>

Specimens having predetermined size were prepared from the vulcanized rubber composition. Tan δ peak temperature was measured from temperature dispersion curve obtained by measuring the sample under the condition of an initial strain 10%, dynamic strain 2%, frequency 10 Hz, amplitude ±0.25% and temperature increase speed of 2° C./minute by using Viscoelastometer VES made by Iwamoto Seisakusyo.

<Rubber Hardness>

Rubber hardness was measured by using type A durometer according to JIS K 6253. The smaller the rubber hardness is, the more excellent performance on ice and snow becomes. The rubber hardness at a room temperature means the rubber hardness at 23° C.

The rubber hardness after aging was obtained by measuring the rubber hardness of the sample with type A durometer according to JIS K 6253 after aging for 14 days in an oven at 85° C. and cooling to a room temperature. The smaller the rubber hardness change after aging is, the longer the initial performance keeps.

Respective test results are shown in Table 1.

TABLE 1

|  |  | Example No. | | | | |
|---|---|---|---|---|---|---|
|  |  | Example | | Comp. Example | | |
|  |  | 1 | 2 | 1 | 2 | 3 |
| Amount (part by weight) | NR | 70 | 70 | 70 | 70 | 70 |
|  | BR | 30 | 30 | 30 | 30 | 30 |
|  | Carbon Black | 30 | 30 | 30 | 30 | 30 |
|  | Silica | 20 | 20 | 20 | 20 | 20 |
|  | Silane coupling agent | 1.6 | 1.6 | 1.6 | 1.6 | 1.6 |
|  | Hydrogenised liquid PB | 30 | 15 |  |  |  |
|  | Liquid PB |  |  | 30 |  | 15 |
|  | Naphtene oil |  | 15 |  | 30 | 15 |
|  | Antioxidant | 2 | 2 | 2 | 2 | 2 |
|  | WAX | 2 | 2 | 2 | 2 | 2 |
|  | Stearic acid | 2 | 2 | 2 | 2 | 2 |
|  | Zinc oxide | 3 | 3 | 3 | 3 | 3 |
|  | Sulfur | 1.5 | 1.5 | 1.5 | 1.5 | 1.5 |
|  | Vulcanization accelerator | 1 | 1 | 1 | 1 | 1 |
| Evaluation Results | Tan δ peak temperature | −60 | −59 | −58 | −59 | −59 |
|  | Hardness at room temp | 44 | 45 | 48 | 42 | 45 |
|  | Hardness after aging | 46 | 48 | 51 | 49 | 50 |
|  | Hardness change after aging | 2 | 3 | 3 | 7 | 5 |
|  | Hardness at 0° C. | 46 | 48 | 51 | 45 | 48 |
|  | Hardness increase from room temp. | 2 | 3 | 3 | 3 | 3 |

From the evaluation results in Table 1, it is understood that the hardness at 0° C. is low in Examples 1 and 2, wherein the hydrogenised liquid polybutadiene is used as a softener, hardness increase after aging is inhibited, and excellent performance on ice and snow can be kept for a long time.

Examples 3 to 8 and Comparative Examples 4 to 18

Material

NR: RSS#1
BR: BR150B available from Ube Industries, Ltd.
carbon black: DIABLACK A available from Mitsubishi Chemical Corporation (N110(SAF) carbon, nitrogen adsorption specific surface area: 142 m²/g)
mineral oil: PS-32 available from Idemitsu Kosan Co., Ltd.
aroma oil: Process X-140 available from JAPAN ENERGY CORPORATION
petroleum resin: Marukarets T100AS available from Maruzen Petrochemical Co., Ltd.
aromatic resin: SP1068 resin available from NIPPON SHOKUBAI CO., LTD.
hydrogenised liquid polybutadiene: prepared in Reference Example 1
liquid polybutadiene (RICON 130 available from SARTOMER (molecular weight 2500)
stearic acid: Kiri available from NOF Corporation
zin oxide: zinc oxide second grade available from Mitsui Mining & Smelting Company, Limited
antioxidant: Nocclac 6C available from OUCHI SHINKO CHEMICAL INDUSTRIAL COMPANY, LIMITED
wax: Ozoace 0355 available from NIPPON SEIRO CO., LTD.
sulfur: powder sulfur available from Tsurumi kagaku kougyo kabushikikaisya
Vulcanization accelerator BBS: Nocceler NS available from OUCHI SHINKO CHEMICAL INDUSTRIAL COMPANY, LIMITED (Preparation Process)

Various agents other than sulfur and a vulcanization accelerator among the compounding components shown in Tables 2 and 3 were kneaded by a Bunbury mixer, to the obtained kneaded product were added sulfur and various vulcanization accelerators, and were kneaded by an open roll at about 80° C. for 3 minutes to obtain a unvulcanized rubber composition. The unvulcanized rubber composition was formed into a tread shape and laminated with other tire parts, and press vulcanized for 35 minutes at 150° C. under 25 kgf to prepare studless tires for a truck and bus (tire size: 11R22.5) in Examples 3 to 8 and Comparative Examples 4 to 18.

(Measuring Method)

Viscoelastic test and rubber hardness were measured by the above-mentioned methods.

<Performance on Ice and Snow>

Studless tires from each of the Examples and Comparative Examples were mounted on a 4-ton car, and real car performance on ice and snow was evaluated under the following conditions. Test place was Asahikawa, Hokkaido test course in our company, a temperature on ice was −1 to −6° C. and a temperature on snow was −2 to −10° C.

Cornering performance (time on snow): Time it took to drive on a figure eight shaped road having an entire length of 800 m (course on snow) was measured. Inverse numbers of respective times were calculated and the performance was expressed with an index by regarding Comparative Example 1 as 100. The bigger the index is, the more excellent the performance is.

Braking performance (brake stopping distance on ice): Stopping distance on ice to stop from putting on lock brake at a speed of 30 km/h was measured. The performance was calculated from the following equation by regarding Comparative Example 1 as a reference.

(Breaking performance index)=(Brake stopping distance in Comparative Example 1)÷(Stop distance)×100

<Abrasion Resistance>

Test specimens having 5 mm thickness were cut out from tread of a studless tire for truck and bus, and depth of wear was measured under the conditions of surface rotating speed 50 m/minute, addition load 3.0 kg, amount of falling sand 15 g/minute, slip ratio 20% by using Lambourn abrasion tester made by Iwamoto seisakusyo kabushikikaisya. These depths of wear were inversed. The other depths of wear were expressed with an index by regarding Comparative Example 1 as 100. The bigger the index is, the more excellent the abrasion resistance is.

<Adhesion Property>

Adhesion force (N) of the uncured rubber composition was measured under the condition of rising speed 30 mm/minute, measuring time 2.5 seconds, a temperature 23° C., humidity 55% by using PICMA tack tester made by Toyo Seiki Seisaku-sho, Ltd. The adhesion property was expressed with an index by regarding adhesion property index in standard compound of Comparative Example 1 as 100 according to the following equation. The bigger the index is, the more excellent the adhesion force is.

(adhesion force index)=(adhesion force in each compound)÷(adhesion force in Comparative Example 1)×100

<Processability>

Moony viscosity ($ML_{1+1}$) was measured at 130° C. according to JIS K6300-1, processability index was calculated by regarding Comparative Example 1 as a reference according to the following equation. The bigger the index is, the more excellent the processability at uncuring.

(processability index)=(Moony viscosity in Comparative Example 1)÷(Moony viscosity in each compound)×100

Test results are shown in Tables 2 to 5.

TABLE 2

| | | Example No. | | | | | |
|---|---|---|---|---|---|---|---|
| | | 3 | 4 | 5 | 6 | 7 | 8 |
| Amount (part by weight) | NR | 60 | 50 | 40 | 60 | 50 | 40 |
| | BR | 40 | 50 | 60 | 40 | 50 | 60 |
| | Carbon black | 50 | 50 | 50 | 50 | 50 | 50 |
| | Mineral oil | | | | 2.5 | 2.5 | 2.5 |
| | Aroma oil | | | | | | |
| | Petroleum resin | | | | | | |
| | Aromatic resin | | | | | | |
| | Hydrogenised liquid PB | 5 | 5 | 5 | 2.5 | 2.5 | 2.5 |
| | Liquid PB | | | | | | |
| | Antioxidant | 2 | 2 | 2 | 2 | 2 | 2 |
| | WAX | 2 | 2 | 2 | 2 | 2 | 2 |
| | Stearic acid | 2 | 2 | 2 | 2 | 2 | 2 |
| | Zinc oxide | 3 | 3 | 3 | 3 | 3 | 3 |
| | Sulfur | 1 | 1 | 1 | 1 | 1 | 1 |
| | Vulcanization accelerator BBS | 1.5 | 1.5 | 1.5 | 1.5 | 1.5 | 1.5 |
| Evaluation Results | Tan δ peak temp. | −55 | −60 | −65 | −55 | −60 | −65 |
| | Rubber hardness at 0° C. | 63 | 62 | 61 | 63 | 62 | 61 |
| | Cornering performance | 100 | 102 | 105 | 102 | 105 | 107 |
| | Braking performance | 101 | 104 | 108 | 102 | 106 | 109 |
| | Abrasion resistance | 118 | 111 | 107 | 111 | 105 | 100 |
| | Adhesion property | 121 | 117 | 115 | 110 | 113 | 117 |
| | Processability | 100 | 99 | 98 | 101 | 99 | 98 |

TABLE 3

| | | Comparative Example No. | | | | |
|---|---|---|---|---|---|---|
| | | 4 | 5 | 6 | 7 | 8 |
| Amount (part by weight) | NR | 60 | 60 | 60 | 60 | 60 |
| | BR | 40 | 40 | 40 | 40 | 40 |
| | Carbon black | 50 | 50 | 50 | 50 | 50 |
| | Mineral oil | 5 | | | | |
| | Aroma oil | | 5 | | | |
| | Petroleum resin | | | | 2.5 | |
| | Aromatic resin | | | | | 2.5 |
| | Hydrogenised liquid PB | | | | | |
| | Liquid PB | | | 5 | | |
| | Antioxidant | 2 | 2 | 2 | 2 | 2 |
| | WAX | 2 | 2 | 2 | 2 | 2 |
| | Stearic acid | 2 | 2 | 2 | 2 | 2 |
| | Zinc oxide | 3 | 3 | 3 | 3 | 3 |
| | Sulfur | 1 | 1 | 1 | 1 | 1 |
| | Vulcanization accelerator BBS | 1.5 | 1.5 | 1.5 | 1.5 | 1.5 |
| Evaluation Results | Tan δ peak temp. | −55 | −50 | −53 | −50 | −50 |
| | Rubber hardness at 0° C. | 62 | 65 | 63 | 66 | 66 |
| | Cornering performance | 100 | 95 | 99 | 93 | 94 |
| | Braking performance | 100 | 96 | 99 | 94 | 95 |
| | Abrasion resistance | 100 | 104 | 97 | 89 | 86 |
| | Adhesion property | 100 | 109 | 119 | 119 | 121 |
| | Processability | 100 | 96 | 99 | 93 | 92 |

TABLE 4

| | | Comparative Example No. | | | | |
|---|---|---|---|---|---|---|
| | | 9 | 10 | 11 | 12 | 13 |
| Amount (part by weight) | NR | 50 | 50 | 50 | 50 | 50 |
| | BR | 50 | 50 | 50 | 50 | 50 |
| | Carbon black | 50 | 50 | 50 | 50 | 50 |
| | Mineral oil | 5 | | | | |
| | Aroma oil | | 5 | | | |
| | Petroleum resin | | | | 2.5 | |
| | Aromatic resin | | | | | 2.5 |
| | Hydrogenised liquid PB | | | | | |
| | Liquid PB | | | 5 | | |
| | Antioxidant | 2 | 2 | 2 | 2 | 2 |
| | WAX | 2 | 2 | 2 | 2 | 2 |
| | Stearic acid | 2 | 2 | 2 | 2 | 2 |
| | Zinc oxide | 3 | 3 | 3 | 3 | 3 |
| | Sulfur | 1 | 1 | 1 | 1 | 1 |
| | Vulcanization accelerator BBS | 1.5 | 1.5 | 1.5 | 1.5 | 1.5 |
| Evaluation Results | Tan δ peak temp. | −60 | −55 | −58 | −55 | −55 |
| | Rubber hardness at 0° C. | 61 | 64 | 62 | 65 | 65 |
| | Cornering performance | 103 | 99 | 103 | 98 | 98 |
| | Braking performance | 104 | 101 | 104 | 100 | 100 |
| | Abrasion resistance | 94 | 101 | 95 | 84 | 82 |
| | Adhesion property | 94 | 104 | 113 | 113 | 115 |
| | Processability | 96 | 93 | 98 | 90 | 89 |

TABLE 5

| | | Comparative Example No. | | | | |
|---|---|---|---|---|---|---|
| | | 14 | 15 | 16 | 17 | 18 |
| Amount (part by weight) | NR | 40 | 40 | 40 | 40 | 40 |
| | BR | 60 | 60 | 60 | 60 | 60 |
| | Carbon black | 50 | 50 | 50 | 50 | 50 |
| | Mineral oil | 5 | | | | |
| | Aroma oil | | 5 | | | |
| | Petroleum resin | | | | 2.5 | |
| | Aromatic resin | | | | | 2.5 |
| | Hydrogenised liquid PB | | | | | |
| | Liquid PB | | | 5 | | |
| | Antioxidant | 2 | 2 | 2 | 2 | 2 |
| | WAX | 2 | 2 | 2 | 2 | 2 |

TABLE 5-continued

|  |  | Comparative Example No. | | | | |
| --- | --- | --- | --- | --- | --- | --- |
|  |  | 14 | 15 | 16 | 17 | 18 |
|  | Stearic acid | 2 | 2 | 2 | 2 | 2 |
|  | Zinc oxide | 3 | 3 | 3 | 3 | 3 |
|  | Sulfur | 1 | 1 | 1 | 1 | 1 |
|  | Vulcanization accelerator BBS | 1.5 | 1.5 | 1.5 | 1.5 | 1.5 |
| Evaluation Results | Tan δ peak temp. | −65 | −58 | −60 | −58 | −58 |
|  | Rubber hardness at 0° C. | 60 | 63 | 61 | 64 | 64 |
|  | Cornering performance | 106 | 102 | 107 | 101 | 101 |
|  | Braking performance | 107 | 104 | 108 | 103 | 103 |
|  | Abrasion resistance | 91 | 97 | 93 | 82 | 79 |
|  | Adhesion property | 91 | 100 | 110 | 109 | 111 |
|  | Processability | 93 | 90 | 93 | 87 | 86 |

From the evaluation results in Tables 2 to 5, it is understood that studless tires for a truck and bus in the Examples wherein hydrogenised liquid polybutadiene is used as a softener are excellent in cornering performance, braking performance, abrasion resistance, adhesion property and processability in a good balance.

INDUSTRIAL APPLICABILITY

According to the present invention, since hydrogenised liquid polybutadiene is used as a softener, it is possible to provide a studless tire which inhibits rubber hardness increase with time and reveals excellent performance on ice and snow for a long time, furthermore, a high performance truck or bus pneumatic tire for winter which are excellent in cornering performance, braking performance, abrasion resistance, adhesion property and processability in a good balance.

The invention claimed is:

1. A studless tire comprising a tread produced from a rubber composition, comprising:
   a rubber component containing natural rubber and butadiene rubber; and
   hydrogenised liquid polybutadiene,
   wherein the total amount of the natural rubber and the butadiene rubber is 80% by weight or more based on 100% by weight of the rubber component,
   the amount of the hydrogenised liquid polybutadiene is 1 to 60 parts by weight based on 100 parts by weight of the rubber component,
   the average molecular weight of the hydrogenised liquid polybutadiene is 600 to 20,000,
   the hydrogenization ratio of the double bond of the hydrogenised liquid polybutadiene is 20 to 60%, and
   a peak temperature of tan δ of the rubber composition is at most −45° C. and rubber hardness of the rubber composition at 0° C. is at most 64.

2. A truck or bus pneumatic tire for winter, comprising a tread produced from a rubber composition, comprising:
   a rubber component containing natural rubber and butadiene rubber; and
   hydrogenised liquid polybutadience,
   wherein the total amount of the natural rubber and the butadiene rubber is 80% by weight or more based on 100% by weight of the rubber component,
   the amount of the hydrogenised liquid polybutadience is 1 to 60 parts by weight based on 100 parts by weight of the rubber component,
   the average molecular weight of the hydrogenised liquid polybutadiene is 600 to 20,000,
   the hydrogenization ratio of the double bond of the hydrogenised liquid polybutadiene is 20 to 60%, and
   a peak temperature of tan δ of the rubber composition is at most −45° C. and rubber hardness of the rubber composition at 0° C. is at most 64.

3. A studless tire according to claim 1,
   wherein the total amount of the natural rubber and the butadiene rubber is 100% by weight based on 100% by weight of the rubber component.

4. A truck or bus pneumatic tire for winter, according to claim 2,
   wherein the total amount of the natural rubber and the butadiene rubber is 100% by weight based on 100% by weight of the rubber component.

5. A studless tire according to claim 1, comprising 5 to 100 parts by weight of carbon black based on 100 parts by weight of the rubber components.

6. A truck or bus pneumatic tire for winter, according to claim 2, comprising 5 to 100 parts by weight of carbon black based on 100 parts by weight of the rubber components.

7. A studless tire according to claim 1, comprising 5 to 100 parts by weight of silica based on 100 parts by weight of the rubber components.

8. A truck or bus pneumatic tire for winter, according to claim 2, comprising 5 to 100 parts by weight of silica based on 100 parts by weight of the rubber components.

* * * * *